Oct. 11, 1938.   J. M. SHIMER   2,133,048
PUMP
Filed Nov. 28, 1936   2 Sheets-Sheet 1
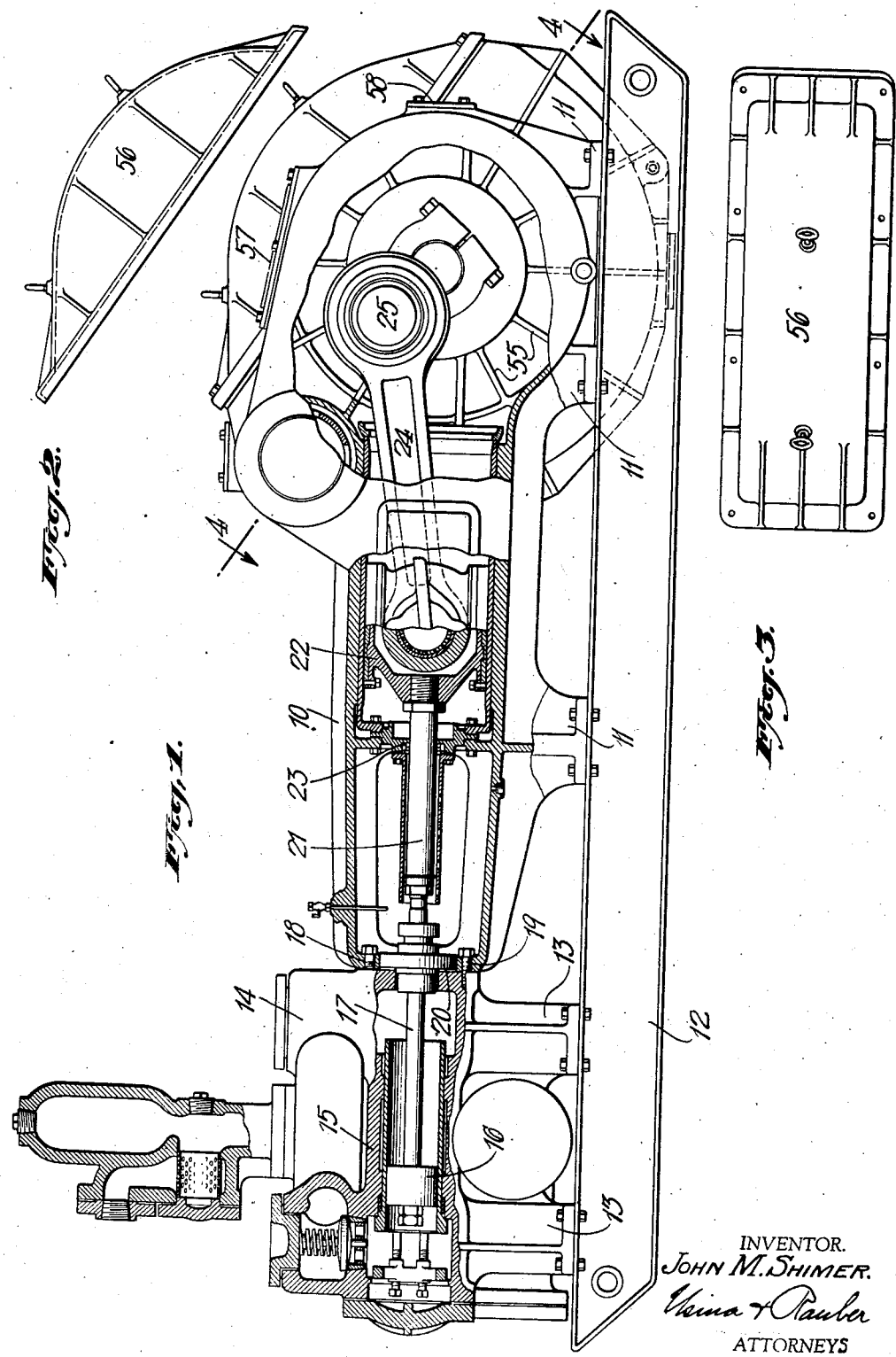
INVENTOR.
John M. Shimer.
ATTORNEYS Oct. 11, 1938.   J. M. SHIMER   2,133,048
PUMP
Filed Nov. 28, 1936   2 Sheets-Sheet 2
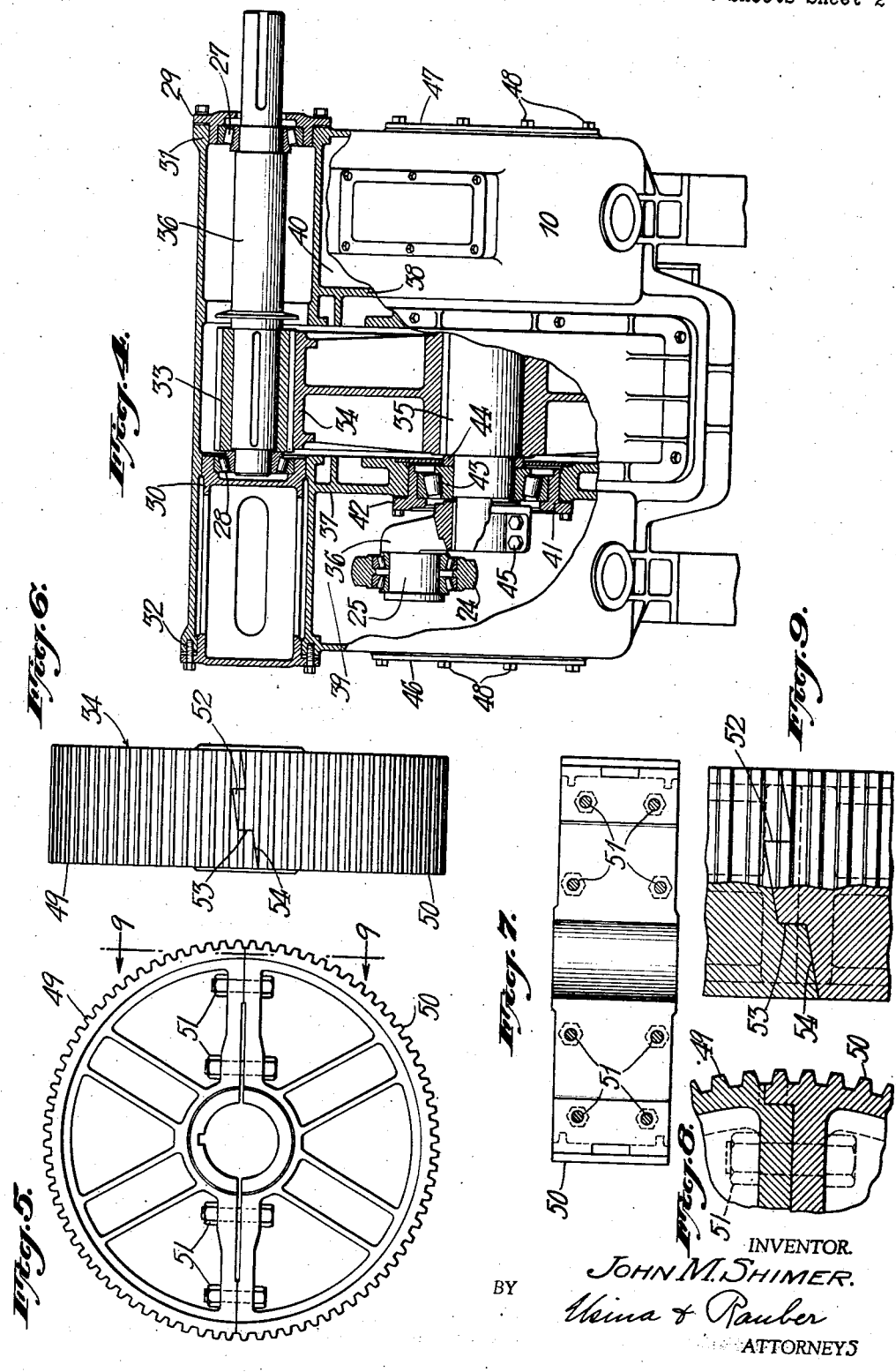
INVENTOR.
John M. Shimer.
BY
Weimar & Rauber
ATTORNEYS Patented Oct. 11, 1938

2,133,048

UNITED STATES PATENT OFFICE 2,133,048

PUMP

John M. Shimer, Dallas, Tex., assignor to Oil Well Supply Company, Dallas, Tex., a corporation of New Jersey Application November 28, 1936, Serial No. 113,242

2 Claims. (Cl. 74—606)

My present invention relates to pumps, such as slush pumps, used in the drilling of oil wells, and more particularly to a power driving mechanism.

Heretofore in power driving mechanism for pumps of this type the bearings of the driving mechanism have been secured in place by caps which, in turn, are secured by bolts, studs or other means. The use of cap constructions of this type, however, limits the rigidity and places other limitations upon the power structure.

In my present invention I provide a pump driving mechanism in which the bearing support is built integrally into the housing or structure containing the driving mechanism, and in which the strength and rigidity of the bearing supports are reinforced in all directions. My invention also provides an enclosed driving mechanism into which the various parts may be inserted and mounted and which, when closed, protects the parts of the power from the entrance of dirt, and provides a lubricating chamber or oil bath for the moving parts.

The various features of the invention are illustrated, by way of example, in the accompanying drawings, in which:

Fig. 1 is a side view, partly in section, of a pump mechanism embodying a preferred form of the invention.

Figs. 2 and 3 are, respectively, side and plan views of a casing cover for the driving mechanism.

Fig. 4 is a view of the driving mechanism, partly in section, on the line 4—4 of Fig. 1.

Fig. 5 is a side view, and Fig. 6 an edge view, of a gear wheel forming a part of the driving mechanism.

Fig. 7 is a plan view of the lower half of the gear wheel shown in Figs. 5 and 6.

Fig. 8 is a view taken on a plane at right angles to the axis of the wheel, showing a section where the two halves join at the outer periphery, and Fig. 9 is a view of the gear wheel in half section taken on the line 9—9 of Fig. 5.

In the embodiment of the invention shown in the accompanying drawings, a casing 10 containing the driving mechanism is provided with feet 11 which are bolted onto a pair of parallel skids 12, on which are also bolted the feet 13 of a pump 14. The pump 14 has a pair of cylinders 15, only one of which is shown in the drawings, the other being a duplicate, and each has a reciprocating piston 16 connected by means of a piston rod 17 to the driving mechanism. The casing 10 of the driving mechanism is inturned at the end abutting each pump 14 to provide for each pump an inwardly extending flange 18 through which the casing is secured to the pump 14 by means of screws 19. The piston rod 17 extends through a suitable gasket 20 mounted in the casing 10 at the inturned flanges 18 and is connected by a rod 21 to a sliding block or pitman 22. The rod 21 is guided in a guide or gasket 23 between the gasket 20 and the pitman 22. The pitman 22 is connected by means of a connecting rod 24 to a crank pin 25 of the driving mechanism. The above detailed construction is shown merely by way of example, and it will be understood that other types and constructions of pumps may be driven from the driving mechanism of my invention.

Power for driving the driving mechanism is supplied from a shaft 26 journalled in a pair of spaced bearings 27 and 28 in bearing supports 29 and 30, respectively, inserted in openings 31 and 32 of the casing 10 into which they are secured by suitable flanges and screws. A gear 33 keyed on the shaft 26 meshes with a gear 34 of larger diameter keyed onto a crank shaft 35 carrying at its outer ends crank arms 36, one for each pump cylinder and piston, and on which the crank pins 25 are mounted.

The casing 10 is provided with partitions 37 and 38 on opposite sides of the gear wheel 34 forming a pair of end crank compartments 39 and 40 and an intermediate oil bath compartment in which the gear wheel 34 is enclosed. The partitions 37 and 38 have openings concentric with the axis of the crank shaft 35, in each of which is mounted a bearing retainer 41. Each bearing retainer has an outwardly projecting flange 42 by means of which it is bolted or attached to its respective partition 37 or 38, and having a cylindrical or tubular portion that supports an anti-friction bearing 43 carrying the crank shaft 35. A spacer 44 is mounted between the inner raceways of the anti-friction bearing and a shoulder on a crank shaft formed by a part of larger diameter on which the gear wheel 34 is keyed. An oil ring 44' is provided about the spacer 44. The crank arms 36 are detachably secured and keyed to the projecting ends of the crank shaft 35 by a split ring construction having tightening bolts 45. Access may be had to opposite ends of the crank shaft 35 through openings in the casing 10, closed by removable cover plates 46 and 47 bolted to the casing 10 by bolts 48.

In assembling the crank shaft in position, the shaft together with the anti-friction bearings 43 may be inserted through one of the openings in the casing 10, the plates 46 and 47 being removed, and the bearing supports 42 may then be bolted in position. The crank arms 36 may then be placed in position and secured by the bolts 45. The gear wheel 34 may then be assembled in position about the shaft 35.

The gear wheel 34 is made of two semi-circular parts 49 and 50 bolted together by bolts 51. The outer peripheral part of the wheel carrying the teeth of the gear has a key and slot construction, a projecting key 52 of one half fitting into a receiving slot 53 of the other, and the joining line between the two parts at this edge portion being diagonal to the periphery of the wheel as shown at 54. The above construction provides one that is easily assembled and in which the gears are enclosed. The central compartment also forms an oil bath in which the gear 34 rotates, and provides lubrication for the gear wheels. The crank arm and connecting rods are also enclosed, the plates 46 and 47 being replaced and bolted to the casing 10.

To increase the rigidity of the supporting partitions 37 and 38 in all directions they are provided with a number of ribs 55 arranged radially of the center line of the crank shaft 35 at spaced intervals or angles. These ribs receive radial thrusts of the crank shaft and thus provide a rigid support for the crank shaft in every direction.

The upper part of the compartment enclosing the gear wheel 34 is formed with a removable flange closure 56 which may be removed to give access to the gear wheel 34 to enable the bolts 51 to be positioned and bolted in place. Each of the crank arm compartments 39 and 40 is also provided with a smaller plate 57 which may be manually removed for inspection or repair or replacement within the respective compartments 39 and 40, and covers 58 therefor are also provided in the walls of the compartments 39 and 40. It will be understood that the central oil bath may be filled when the cover 56 is removed, and that a suitable drain will be provided for draining used oil therefrom.

What I claim is:

1. Power transmitting mechanism which comprises a housing having a pair of spaced partitions therein dividing the housing into three compartments, aligned bores in said partitions, removable bearings in said bores, openings in the side walls of the housing opposite said aligned bores to provide access to each outside compartment and to permit the insertion of a crank shaft within the housing through said aligned bores, cover plates for said side wall openings, an opening in the housing adapted to provide access to the center compartment for the assembly of a split gear on said shaft, and a cover plate for said opening.

2. Power transmitting mechanism which comprises a housing having a pair of spaced partitions therein dividing the housing into three compartments, aligned bores in said partitions, removable bearings in said bores, openings in the side walls of said housing opposite said aligned bores to provide access to each outside compartment, cover plates for said side wall openings, an opening in the housing adapted to permit access to the center compartment, a cover plate for said opening, a crank shaft extending through said bores seated in said removable bearings, a split gear member mounted on said shaft in the center compartment, crank arms mounted on said shaft in each outside compartment, a drive shaft extending into said housing, removable bearing members suporting said drive shaft, and gear means connecting the said drive shaft to said split gear member mounted on the said shaft in the center compartment.

JOHN M. SHIMER.